US009360384B2

(12) United States Patent
Beck

(10) Patent No.: US 9,360,384 B2
(45) Date of Patent: Jun. 7, 2016

(54) SYSTEM, METHOD, AND DEVICE FOR SENSING PRESSURE OF A FLUID

(71) Applicant: David William Beck, Santa Fe, NM (US)

(72) Inventor: David William Beck, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 346 days.

(21) Appl. No.: 14/181,309

(22) Filed: Feb. 14, 2014

(65) Prior Publication Data

US 2014/0238143 A1 Aug. 28, 2014

Related U.S. Application Data

(60) Provisional application No. 61/768,780, filed on Feb. 25, 2013.

(51) Int. Cl.

| | |
|---|---|
| ***G01L 7/04*** | (2006.01) |
| ***G01L 9/00*** | (2006.01) |
| ***G01L 9/08*** | (2006.01) |

(52) U.S. Cl.
CPC . *G01L 7/04* (2013.01); *G01L 9/003* (2013.01); *G01L 9/08* (2013.01)

(58) Field of Classification Search
CPC .............. G01L 7/04; G01L 9/003; G01L 9/08
USPC .................... 73/742, 741, 732, 700, 862.626, 73/862.621; 361/283.1, 283.2
See application file for complete search history.

(56) References Cited

U.S. PATENT DOCUMENTS 4,279,155 A * 7/1981 Balkanli .................. G01K 5/36 361/282
4,386,386 A * 5/1983 Akita .................... G01B 7/001 361/278

* cited by examiner

*Primary Examiner* — Lisa Caputo
*Assistant Examiner* — Nathaniel T Woodward
(74) *Attorney, Agent, or Firm* — King & Spalding LLP

(57) ABSTRACT

A pressure sensor for sensing a pressure of a fluid includes a Bourdon tube that has a helical segment and an anvil. A portion of the anvil is positioned within the helical segment. The sensor also includes a dielectric material positioned between the portion of the anvil and the helical segment. The anvil, the dielectric material, and the helical segment form a variable capacitor. A capacitance of the variable capacitor changes based on a pressure applied to the Bourdon tube.

20 Claims, 7 Drawing Sheets

100 104 112 110 108 102 106 114 116

100 202 202 112 110 108 102 104 204 206 114 116

SYSTEM, METHOD, AND DEVICE FOR SENSING PRESSURE OF A FLUID

CROSS-REFERENCE TO RELATED APPLICATIONS

The present application claims priority under 35 U.S.C. Section 119(e) to U.S. Provisional Patent Application No. 61/768,780, filed Feb. 25, 2013, and titled "System, Method and Device for Sensing Pressure of a Fluid," the entire content of which is incorporated herein by reference.

TECHNICAL FIELD

The present disclosure relates generally to pressure sensing and more particularly to systems, methods and devices for sensing pressure using a Bourdon tube.

BACKGROUND

Pressure sensors are used often for sensing fluid pressure in applications such as oil and gas operations. For example, a fluid may apply pressure on a pressure sensor, and the pressure sensor may sense the fluid pressure and generate a signal that corresponds to the fluid pressure. Factors such as cost, sensing range, sensitivity to change in pressure, and durability may make some pressure sensors more preferable than others for some applications. For example, some sensors may not be usable in harsh environments such as areas with very high temperatures. To illustrate, some sensors include active electronics that have limited use, for example, due to reliability issues in environments with relatively high temperatures. Further, a pressure sensor that includes active electronic components may be relatively more expensive than a pressure sensor that uses only passive components.

Some pressure sensors have many moving parts that make the sensors generally prone to breakdowns. Repairs and/or replacement of pressure sensors due to reliability issues may be time consuming and costly, particularly in applications such as oil and gas operations.

Thus, a pressure sensor that uses passive components and that has relatively few moving parts may be desirable.

SUMMARY

The present disclosure relates generally to pressure sensing using a piezoelectric pressure transducer. In an example embodiment, a pressure sensor includes a Bourdon tube having a helical segment. The pressure sensor further includes an anvil. A portion of the anvil is positioned within the helical segment. The pressure sensor also includes a dielectric material positioned between the portion of the anvil and the helical segment. The anvil, the dielectric material, and the helical segment form a variable capacitor. A capacitance of the variable capacitor changes based on a pressure applied to the Bourdon tube.

In another example embodiment, a system for measuring a pressure of a fluid includes a resonator having a first terminal and a second terminal. The system further includes a signal source configured to provide a signal to the resonator via the first terminal of the resonator. The system also includes a receiver configured to receive the signal from the resonator. The system further includes a pressure sensor electrically coupled to the second terminal of the resonator and to the receiver. The receiver is configured to receive the signal via the pressure sensor that includes a Bourdon tube having a helical segment. The pressure sensor further includes an anvil, where a portion of the anvil is positioned within the helical segment. The pressure sensor also includes a dielectric material positioned between the portion of the anvil and the helical segment.

In another example embodiment, a method for measuring a pressure of a fluid includes providing a signal to a resonator and receiving the signal through the resonator and a pressure sensor that is electrically coupled to the resonator. The method further includes processing the signal to determine the pressure sensed by the pressure sensor based on a frequency of the signal. The pressure sensor includes a Bourdon tube having a helical segment. The pressure sensor further includes an anvil, where a portion of the anvil is positioned within the helical segment. The pressure sensor also includes a dielectric material positioned between the portion of the anvil and the helical segment.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1A:
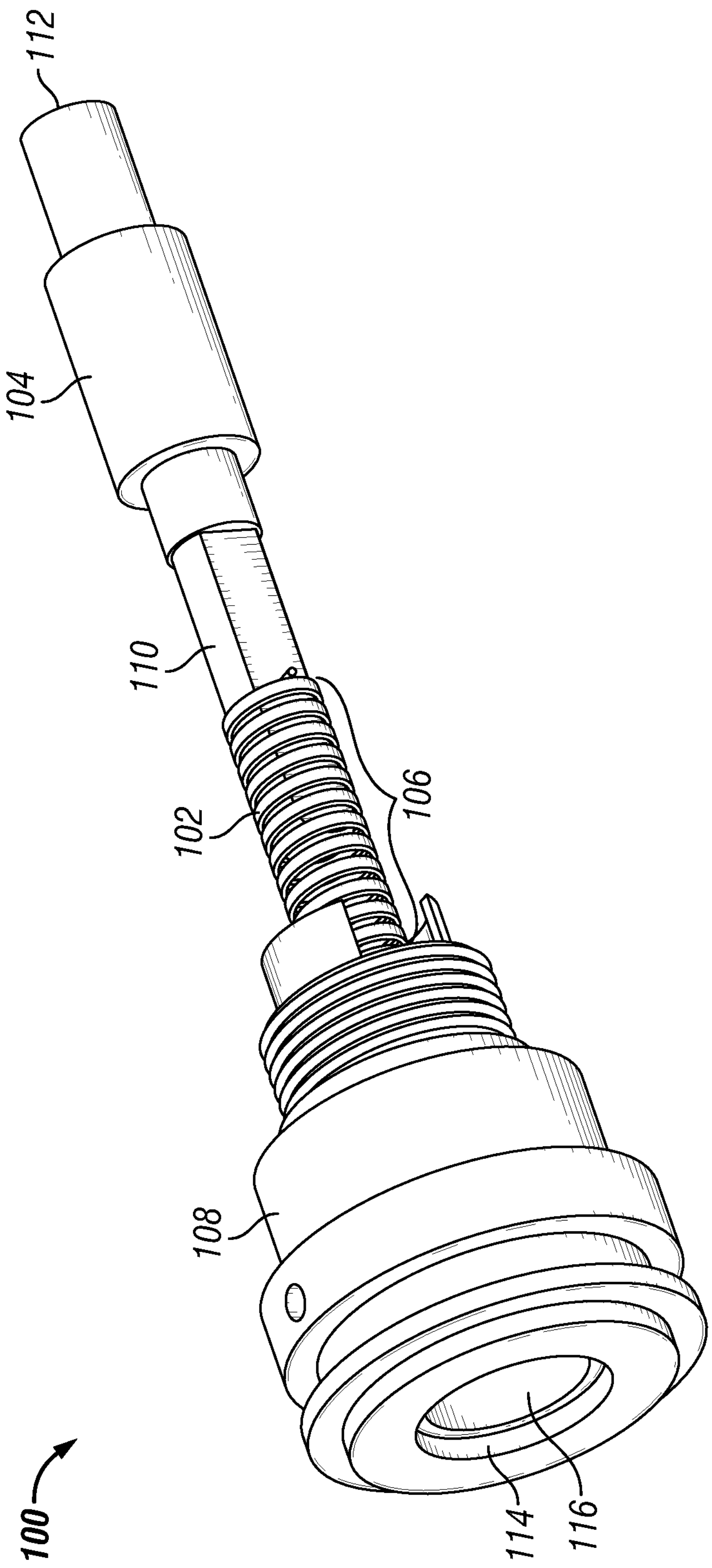
FIG. 1A is a perspective view of a pressure sensor for sensing a pressure of a fluid according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF EXEMPLARY EMBODIMENTS

In the following paragraphs, particular embodiments will be described in further detail by way of example with reference to the drawings. In the description, well-known components, methods, and/or processing techniques are omitted or briefly described. Furthermore, reference to various feature (s) of the embodiments is not to suggest that all embodiments must include the referenced feature(s).

Figure 1B:
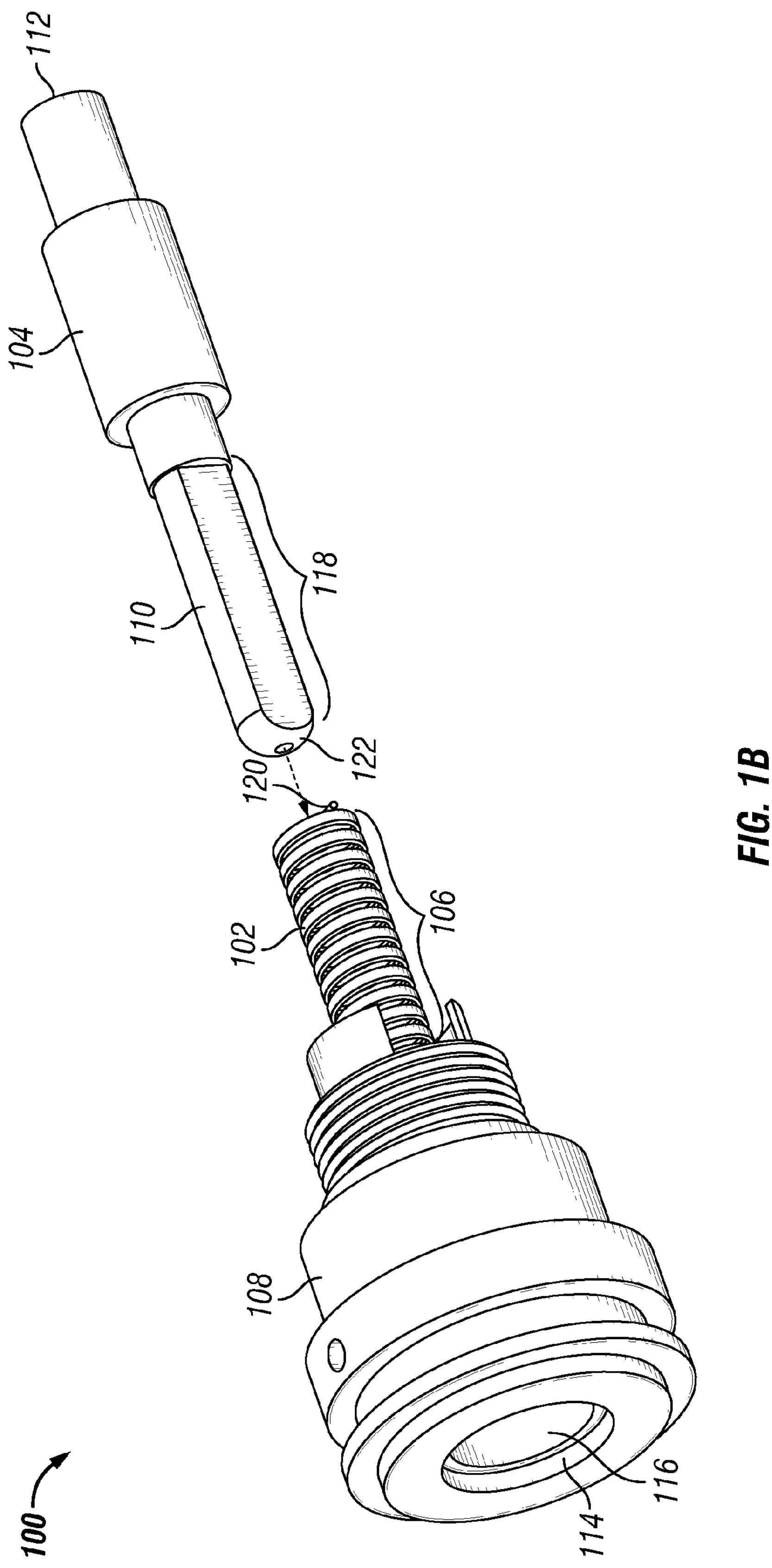
FIG. 1B is an exploded view of the pressure sensor of FIG. 1A according to an example embodiment.

Turning now to the drawings, FIG. 1A illustrates a perspective view of a pressure sensor for sensing a pressure of a fluid according to an example embodiment. FIG. 1B is an exploded view of the pressure sensor of FIG. 1A according to an example embodiment. The pressure sensor 100 is configured to sense pressure exerted by a fluid and to associate the pressure to a corresponding capacitance. The pressure sensor 100 is configured to sense a wide range of fluid pressure levels over a wide range of temperature conditions. For example, some embodiments of the pressure sensor 100 are configured to operate in an environment having a temperature that ranges from below freezing to over 600 degrees Fahrenheit. Some embodiments of the pressure sensor may also sense pressure levels ranging from 0 PSI to over 20,000 PSI.

In an example embodiment, the pressure sensor 100 includes a Bourdon tube 102, an anvil 104, and a dielectric material 110 that is placed between the Bourdon tube 102 and the anvil 104. The Bourdon tube 102 has a helical segment 106 that is substantially helix-shaped. Some or all of a portion 118 of the anvil 104 may be positioned in the helical segment 106 of the Bourdon tube 102. A segment comprising some or all of the portion 118 of the anvil 104 and a portion of the helical segment 106 surrounding the segment of the portion 118 effectively form the plates of a variable capacitor on opposite sides of the dielectric material 110. In an example embodiment, the pressure sensor 100 also includes a pressure interface 108 that is designed for exposure to a fluid exerting a pressure to be sensed. The Bourdon tube 102 is attached to the pressure interface 108 at one side of the pressure interface 108.

In an example embodiment, the Bourdon tube 102 includes the helical segment 106 and a substantially straight segment described below with respect to FIG. 3. The Bourdon tube 102 is hollow and includes a closed end at an end of the helical segment 106 and an open end at an end of the substantially straight segment as described below with respect to FIG. 3. The Bourdon tube 102 may be made from an electrically conductive material, such as inconel, another nickel superalloy, a beryllium based alloy, other materials, or a combination thereof. In an example embodiment, the helical segment 106 of the Bourdon tube 102 is configured to have a dimensional change in response to a pressure applied to the Bourdon tube 102. For example, a portion of the helical segment 106 of the Bourdon tube 102 may expand or shrink radially (for example, as illustrated in FIG. 4) around a segment of the portion 118 of the anvil 104 in response to a pressure applied to the Bourdon tube 102. The pressure may be applied to the Bourdon tube 102 by a fluid (i.e., a gas and/or a liquid) through an opening at the open end of the Bourdon tube 102 as described below with respect to FIG. 2.

In an example embodiment, the anvil 104 includes a first end 112 and a second end 122. The first end 112 of the anvil is configured to be coupled to a conductor that electrically couples the anvil 104 to a resonator (e.g., a crystal resonator) as described below with respect to FIG. 6. As illustrated in FIG. 1B, the second end 122 of the anvil 104 is positioned within the helical segment 106 of the Bourdon tube 102. The anvil 104 further includes the portion 118 configured to fit within the helical segment 106 of the Bourdon tube 102. In an example embodiment, the portion 118 of the anvil 104 has two curved sides and two substantially flat sides. In alternative embodiments, the portion 118 may have one or more surfaces with other shapes. For example, the portion 118 of the anvil 104 may have a substantially circular cross-section. Further, in alternative embodiments, the anvil 104 may have other shapes without departing from the scope of this disclosure. For example, the entire length of the anvil 104 between the first end 112 and the second end 122 may be substantially the same or similar in shape to the portion 118 of the anvil 104.

In a particular embodiment, the anvil 104 may be made from an electrically conductive material, such as copper, stainless steel, inconel, invar, brass, other materials, or a combination thereof. For example, the anvil 104 may be made from inconel for high temperature applications and from brass for low temperature applications. As illustrated in FIGS. 1A and 1B, the portion 118 of the anvil 104 is covered with the dielectric material 110.

In an example embodiment, the dielectric material 110, which is an electrical insulator, may be placed on the portion 118 of the anvil 104 or a section thereof. To illustrate, the portion 118 of the anvil 104 may be coated with the dielectric material 110. For example, a ceramic may be spray coated on the portion 118 of the anvil 104 or part thereof. Alternatively, the portion 118 of the anvil 104 may be dipped in a dielectric liquid and subsequently dried. The dielectric material 110 may also be a dielectric sleeve that is placed over the portion 118 of the anvil 104. Although FIGS. 1A and 1B show the dielectric material 110 positioned on the portion 118 of the anvil 104, in alternative embodiments, a dielectric material may be applied to one or both surfaces of the helical segment 106 and the portion 118 of the anvil 104. Further, in alternative embodiments, the dielectric material 110 may be applied to a segment of the portion 118 instead of the entire length of the portion 118.

In an example embodiment, the Bourdon tube 102 and the anvil 104 are electrically conductive such that the anvil 104, the dielectric material 110, and the helical segment 106 form a variable capacitor. To illustrate, a segment of the portion 118 of the anvil 104 may be positioned in the helical segment 106 of the Bourdon tube 102. The segment of the portion 118 of the anvil 104 and a portion of the helical segment 106 surrounding the segment of the portion 118 effectively form the plates of the variable capacitor on opposite sides of the dielectric material 110. In an example embodiment, both the Bourdon tube 102 and the anvil 104 are made from inconel or another conductive material. For example, the Bourdon tube 102 and the anvil 104 may be made from the same material or similar materials to mitigate effects of thermal expansion under some temperature conditions.

In an example embodiment, the capacitance of the variable capacitor formed by the anvil 104, the dielectric material 110, and the helical segment 106 may change based on a pressure applied to the Bourdon tube 102. The pressure is applied to Bourdon tube 102 through an opening of the Bourdon tube 102 as discussed below with respect to FIG. 2.

In an example embodiment, at least a portion of the helical segment 106 may undergo a dimensional change in response to a change in the pressure applied to the Bourdon tube 102. For example, a portion of the helical segment 106 surrounding a segment of the portion 118 of the anvil 104 may have a dimensional change in response to the change in the pressure applied to the Bourdon tube 102. In turn, the dimensional change of the portion of the helical segment 106 may result in a corresponding capacitance change of the variable capacitor formed by the anvil 104, the dielectric material 110, and the helical segment 106.

In an example embodiment, the dimensional change of the helical segment 106 of the Bourdon tube 102 is a radial dimensional change (e.g., change in a diameter) in part of or the entire portion of the helical segment 106 surrounding the segment of the portion 118 of the anvil 104. For example, a portion of the helical segment 106 surrounding the segment of the portion 118 of the anvil 104 may radially expand in response to an increase in the pressure applied to the Bourdon tube 102. Such a radial expansion of the portion of the helical segment 106 may increase a distance between the expanding portion of the helical segment 106 and the segment of the portion 118 of the anvil 104 that is surrounded by the expanding portion of the helical segment 106. Such an increase in distance may result in a decrease in the capacitance of the variable capacitor formed by the anvil 104, the dielectric material 110, and the helical segment 106.

In an example embodiment, the radial dimensional change in the portion of the helical segment 106 surrounding the segment of the portion 118 of the anvil 104 may be a radial shrinkage in response to a reduction in the pressure applied to the Bourdon tube 102. Such radial shrinkage of the portion of the helical segment 106 may decrease the distance between the shrinking portion of the helical segment 106 and the segment of the portion 118 of the anvil 104 that is surrounded by the shrinking portion of the helical segment 106. Such a reduction in distance may result in an increase in the capacitance of the variable capacitor formed by the anvil 104, the dielectric material 110, and the helical segment 106.

In an example embodiment, thirty seven picofarads (pf) capacitance of the variable capacitor corresponds to approximately zero PSI applied to the Bourdon tube 102, and 20 pf corresponds to approximately 3,000 PSI applied to the Bourdon tube 102. In some embodiments, the pressure applied to the Bourdon tube 102 through the opening in the open end of the Bourdon tube 102 ranges from 0 PSI to 20,000 PSI.

Although FIGS. 1A and 1B show only a segment (approximately 50 percent) of the portion 118 of the anvil 104 is positioned within the helical segment 106 of the Bourdon tube 102, in alternative embodiments, substantially the entire portion 118 may be positioned within the helical segment 106. Further, in alternative embodiments, larger or smaller segments of the portion 118 of the anvil 104 may be positioned within the helical segment 106.

In an example embodiment, the pressure interface 108 is configured to interface with a fluid exerting the pressure to be sensed. The pressure interface 108 includes an opening 114 and a fluid compartment 116. The Bourdon tube 102 is attached to the pressure interface 108 on the side of the pressure interface 108 opposite to the opening 114. For example, the open end of the Bourdon tube 102 (shown in FIG. 3) may be attached to the pressure interface 108 and may connect to the fluid compartment 116 via a fluid pathway. To illustrate, the open end of the Bourdon tube 102 may be coupled to the pressure interface 108 and may extend to the fluid compartment 116. Alternatively, the open end of the Bourdon tube 102 may be connected to the fluid compartment 116 by a fluid pathway in the pressure interface 108. In an example embodiment, the Bourdon tube 102 is attached to the pressure interface 108 such that the positions of the helical segment 106 and the anvil 104 relative to each other remain substantially the same under the same pressure condition. For example, the pressure interface 108 may maintain the Bourdon tube 102 substantially coaxial with the anvil 104, such that the helical segment 106 of the Bourdon tube 102 remains substantially coaxial with the anvil 104 even when the helical segment 106 or a portion thereof expands or shrinks radially. In alternative embodiments, the pressure interface 108 may have other shapes, sections, and connections without departing from the scope of this disclosure.

In an example embodiment, the pressure interface 108 may have a fluid separator (e.g., a diaphragm or a filter element) at the opening 114 that is configured to isolate an isolation fluid contained in the fluid compartment 116 from a fluid outside of the pressure interface 108 that is exerting the pressure to be sensed. The separator at the opening 114 is configured to transfer pressure exerted by the external fluid to the isolation fluid contained in the fluid compartment 116. The separator is also configured to keep unwanted material, such as sand, from entering the hollow portion of the Bourdon tube 102 that has an open end interfacing with the fluid compartment 116. The pressure from the external fluid that is transferred to the isolation fluid is applied to the Bourdon tube 102 through the opening in the open end of the Bourdon tube 102.

During operation, the open end of the Bourdon tube 102 may be exposed to a fluid that enters the hollow portion of the Borden tube 102 through the open end and may exert a pressure to be sensed. For example, the open end of the Bourdon tube 102 may be exposed to the fluid through the pressure interface 108. Prior to being exposed to the fluid, a portion of the helical segment 106 surrounding a segment of the portion 118 has an initial radial dimension (e.g., an initial diameter) that corresponds to substantially zero pressure (i.e., approximately 0 PSI) being applied to the Bourdon tube 102. The initial radial dimension also corresponds to an initial capacitance value of the variable capacitor formed by the anvil 104, the dielectric material 110, and the helical segment 106. When the open end of the Bourdon tube 102 gets exposed to the fluid, the fluid may apply a pressure to the Bourdon tube 102. In response to the pressure, the portion of the helical segment 106 may expand radially to a new radial dimension (e.g., a new diameter) relative to the segment of the portion 118 that remains fixed. As described above, the new radial dimension of the portion of the helical segment 106 corresponds to the pressure applied by the fluid and to a new capacitance value of the variable capacitor formed by the anvil 104, the dielectric material 110, and the helical segment 106. For example, the pressure applied by the tube may be in the range of 0-3,000 PSI or 0-20,000 PSI. When the pressure applied to the Bourdon tube 102 returns substantially to 0 PSI, the radial dimension of the portion of the helical segment 106 returns approximately to the initial radial dimension. The above described operation and variations thereof may be performed repeatedly for various ranges of the pressure. Further, the radial dimension of the portion of the helical segment 106 may vary up or down without first returning to the initial radial dimension.

Thus, the pressure sensor 100 associates the fluid pressure levels with capacitance values. When the pressure applied to the Bourdon tube 102 changes, the portion of the helical segment 106 may radially expand or shrink depending on whether the applied pressure increased or decreased, respectively. The capacitance of the variable capacitor formed by the anvil 104, the dielectric material 110, and the helical segment 106 may decrease or increase based on whether the radial dimension of the helical segment 106 or portion thereof increases or decreases.

In the above operation, the Bourdon tube 102 may be exposed to the fluid directly or indirectly via an isolation fluid in the fluid compartment 116 of the pressure interface 108. Although FIGS. 1A and 1B illustrate the Bourdon tube 102 that has the helical segment 106, which has a substantially helical shape, in alternative embodiments, the Bourdon tube 102 may instead have a segment that is not substantially helical without departing from the scope of this disclosure. Further, instead of the Bourdon tube 102, the pressure sensor 100 may include another hollow or partially hollow tube that has a segment that is substantially helical or a segment with a different spiral or other shape without departing from the scope of this disclosure.

Figure 2:
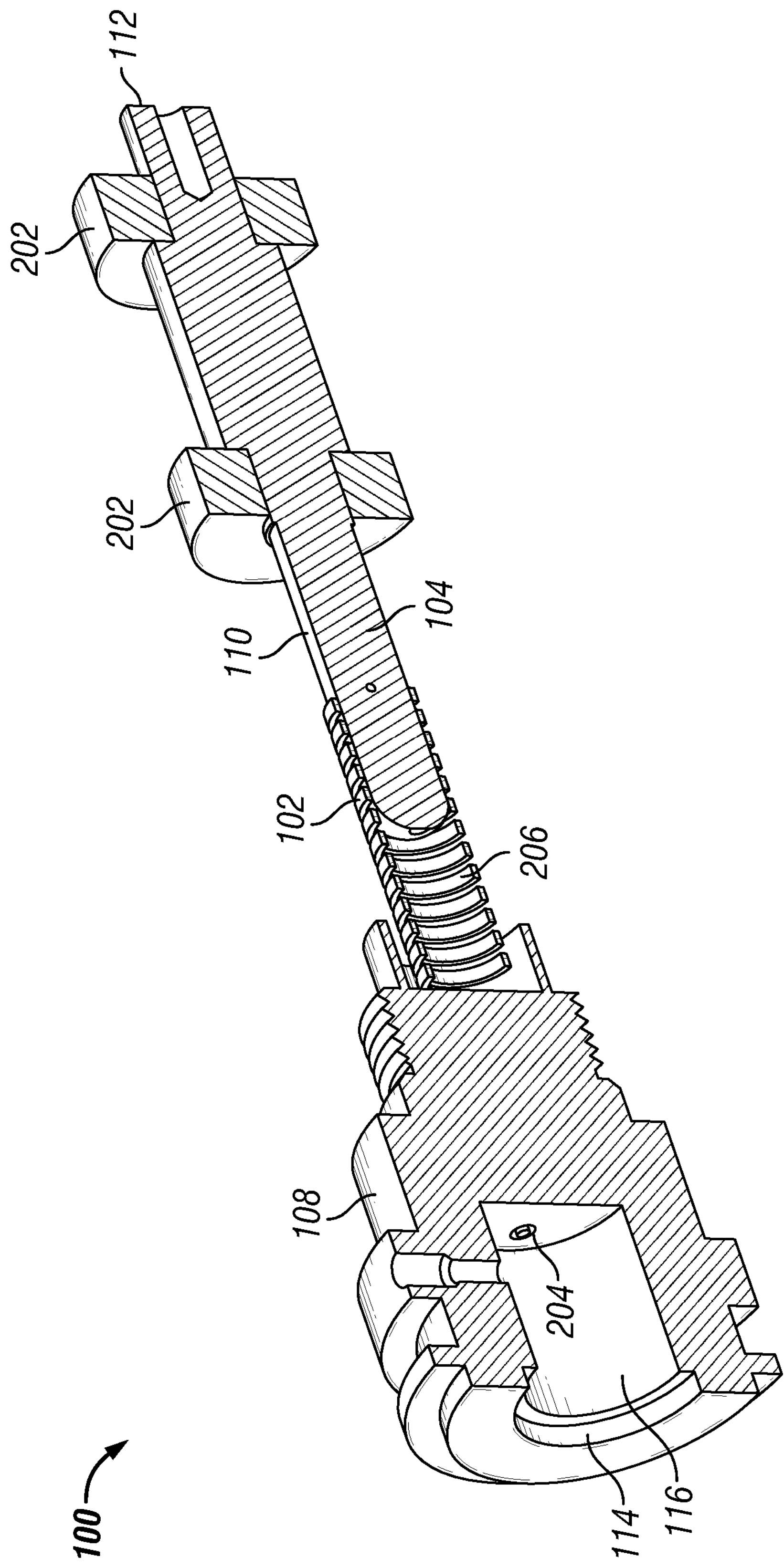
FIG. 2 is a cross-sectional view of the pressure sensor of FIGS. 1A and 1B according to an example embodiment.

FIG. 2 is a cross-sectional view of the pressure sensor 100 of FIGS. 1A and 1B according to an example embodiment. To minimize redundancy, not all features of the pressure sensor 100 discussed with respect to FIGS. 1A and 1B are repeated below. As described above, the pressure sensor 100 includes the Bourdon tube 102, the anvil 104, and the dielectric material 110 positioned between portions of the Bourdon tube 102 and the anvil 104. FIG. 2 illustrates a surface 206 of the helical segment 106 that is proximal to the anvil 104 and that may be coated with a dielectric insulator, such as the dielectric material 110.

In an example embodiment, the pressure sensor 100 may optionally include isolators 202 that are attached to the anvil 104. The isolators 202 are configured to isolate the anvil 104 from an electrical ground. In some embodiments, the isolators 202 are also configured to maintain the anvil 104 physically stable relative to the pressure interface 108 and relative to the helical segment 106 of the Bourdon tube 102. For example, the isolators 202 may maintain the anvil 104 substantially coaxial with the helical segment 106, such that the helical segment 106 of the Bourdon tube 102 remains substantially coaxial with the anvil 104 even when the helical segment 106 or a portion thereof expands or shrinks radially.

In an example embodiment, the pressure interface 108 includes a pathway opening 204. For example, the open end of the Bourdon tube 102 (illustrated in FIG. 3) may extend through a portion of the pressure interface 108 to the pathway opening 204. Alternatively, the open end of the Bourdon tube 102 may extend only partially through a portion of the pressure interface 108 and may connect with the pathway opening through a fluid pathway in the portion of the pressure interface 108. In an example embodiment, the open end and/or the substantially straight segment of the Bourdon tube 102 may be attached to the pressure interface 108 by soldering or other means that fixedly attaches the Bourdon tube 102 to the pressure interface 108.

In an example embodiment, the maximum pressure that can be reliably sensed by the pressure sensor 100 depends on, among other factors, the maximum radial dimension (e.g., a diameter) the helical segment 106 of the Bourdon tube 102 may achieve without exceeding its capability to consistently return approximately to a particular radial dimension in response to a particular pressure level applied to the Bourdon tube 102. If the helical segment 106 exceeds the maximum radial dimension, the pressure sensor 100 may no longer accurately sense the pressure applied to the Bourdon tube 102.

During operation, the pressure interface 108 may be exposed to a fluid having a pressure to be sensed. For example, the fluid may enter the fluid compartment 116 of the pressure interface 108 through the opening 114. The fluid may enter the Bourdon tube 102 through the pathway opening 204 in the pressure interface 108. Based on the pressure applied to the Bourdon tube 102 by the fluid that enters the Bourdon tube 102, a portion of the helical segment 106 may radially expand. For example, a diameter of a portion of the helical segment 106 may increase, which reduces the capacitance of the variable capacitor formed by the anvil 104, the dielectric material 110, and the helical segment 106.

If the pressure applied to the Bourdon tube 102 by the fluid further increases, the portion of the helical segment 106 may further expand radially, further reducing the capacitance of the variable capacitor. If the pressure applied to the Bourdon tube 102 by the fluid decreases back to the original pressure level or another pressure level, the portion of the helical segment 106 that had radially expanded may shrink back radially to approximately its original radial dimension or another radial dimension, respectively. In a particular embodiment, portions of the helical segment 106 that are close to the closed end (i.e., distal from the pressure interface 108) of the Bourdon tube 102 may expand radially more than portions of the helical segment 106 that are close to the pressure interface 108. In an example embodiment, the above described operation may repeat until the pressure level of the fluid stays substantially constant. Thus, the pressure sensor 100 senses pressure applied by a fluid by associating the pressure with a capacitance value of the variable capacitor formed by the anvil 104, the dielectric material 110, and the helical segment 106.

Although, the pressure sensor 100 may include the Bourdon tube 102, in alternative embodiments, the pressure sensor 100 may instead include a hollow or a partially hollow tube that has a segment that is substantially helical or a segment that is shaped differently without departing from the scope of this disclosure.

Figure 3:
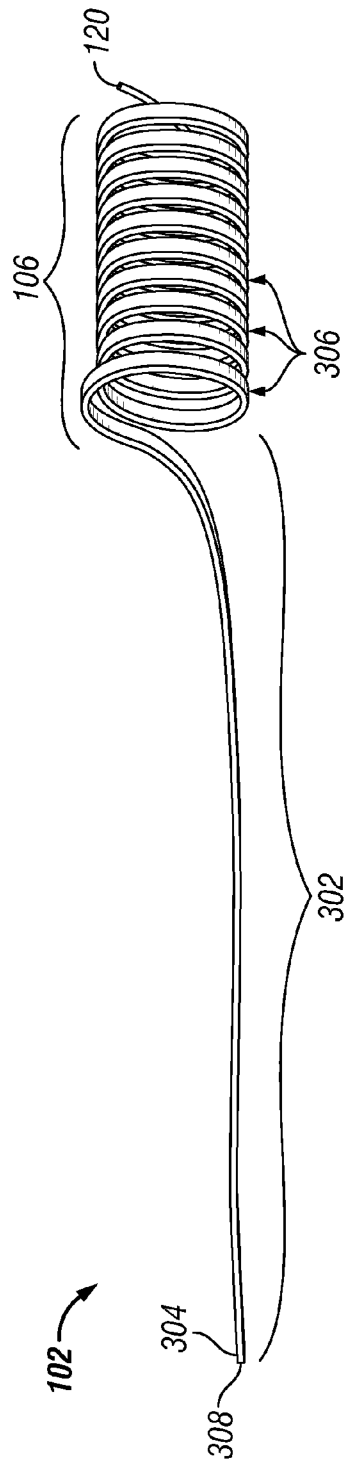
FIG. 3 is a perspective view of a Bourdon tube having a helical segment according to an example embodiment.
Figure 4:
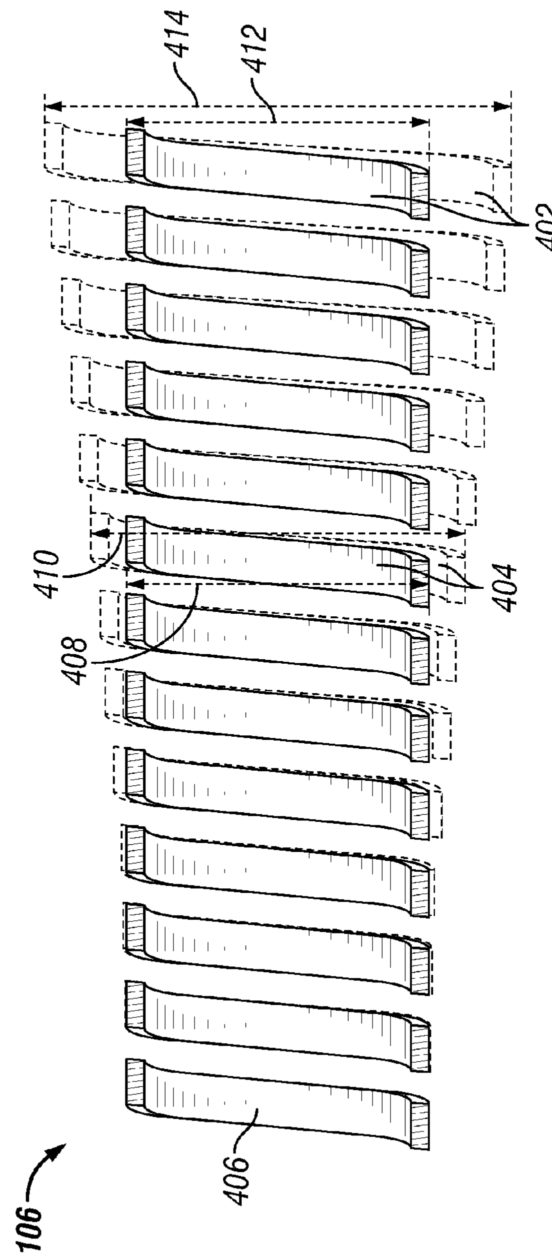
FIG. 4 illustrates a dimensional comparison of a helical segment of a Bourdon tube under two different pressure conditions according to an example embodiment.

FIG. 3 is a perspective view of the Bourdon tube 102 that has a helical segment according to an example embodiment. The Bourdon tube 102 is a hollow tube made from an electrically conductive material. The Bourdon tube 102 includes the helical segment 106 and another segment 302 that is substantially straight. The Bourdon tube 102 has an open end 304 at an end of the segment 302 and a closed end 120 opposite the open end 304. As illustrated in FIG. 3, the closed end 120 is proximal to the helical segment 106. For example, the closed end 120 may be welded shut. The Bourdon tube 102 also includes an opening 308 at the open end 304. As describe above, fluid pressure is applied to the Bourdon tube 102 through the opening 308 at the open end 304. The Bourdon tube 102 may be heat treated and/or plated or coated with materials other than those mentioned herein.

The helical segment 106 has a number of windings 306 that have a particular pitch (i.e., a spacing) between them. In an example embodiment, substantially the entire helical segment 106 of the Bourdon tube 102 may be partially flattened. Prior to the partial flattening of the helical segment 106, the tubing in the Bourdon tube 102 may have a substantially circular cross-section with a corresponding diameter generally referred to as an internal diameter.

In an example embodiment, the Bourdon tube 102 may be attached to a pressure interface, such as the pressure interface 108 of FIGS. 1A, 1B, and 2, by soldering along the segment 302. For example, the Bourdon tube 102 may be attached to the pressure interface 108 by soldering the segment 302 to the pressure interface 108 proximal to the helical segment 106. As illustrated in FIG. 2, the open end 304 may extend through a portion of the pressure interface 108 to the pathway opening 204. Alternatively, the open end 304 may connect to a fluid pathway in a portion of the pressure interface 108 connected to the pathway opening 204.

As described above, the maximum pressure that can be reliably sensed by the pressure sensor 100 of FIGS. 1A, 1B, and 2 depends on the maximum radial dimension (e.g., a diameter) the helical segment 106 of the Bourdon tube 102 may have without exceeding its capability to consistently return to a particular radial dimension in response to a particular pressure level applied to the Bourdon tube 102. The maximum radial dimension of the helical segment 106 may depend on a number of factors including the internal diameter of the tubing of Bourdon tube 102, the number of windings 306 of the helical segment 106, the pitch of the windings 306, wall thickness of the tubing of the Bourdon tube 102, a length of the helical segment 106, and the radial dimension (e.g., a diameter) of the helical segment 106 prior to applying a non-zero pressure to the Bourdon tube 102. Thus, the maximum pressure the pressure sensor 100 can sense may be adjusted by changing one or more of these factors. For example, by increasing the wall thickness of the tubing of the Bourdon tube 102, the range of pressure that may be sensed by the pressure sensor 100 can be increased.

Although the segment 302 appears longer than the helical segment 106 in FIG. 3, in alternative embodiments, the segment 302 may have the same length or may be shorter than the helical segment 106.

FIG. 4 illustrates a dimensional comparison of the helical segment 106 of the Bourdon tube 102 of FIGS. 1A, 1B, 2, and 3 under two different pressure conditions according to an example embodiment. In an example embodiment, the winding 402 is distal from the pressure interface 108 and the winding 406 is proximal to the pressure interface 108. For example, the winding 402 has a radial dimension (e.g., diameter) 412 when approximately 0 PSI is applied to the Bourdon tube 102. In contrast, the winding 402 has a radial dimension 414 when more pressure is applied to the Bourdon tube 102. As illustrated, the radial dimension 414 is larger than the radial dimension 412. Similarly, the winding 408 has a radial dimension 408 under approximately 0 PSI and a radial dimension 410 under a higher pressure. While the difference between the radial dimensions 410 and 408 is less than the difference between radial dimensions 414 and 412, both differences may contribute to a change in capacitance of the variable capacitor formed by the anvil 104, the dielectric material 110, and the helical segment 106, the helical segment 106. In contrast, the winding 406, which is proximal to the pressure interface 108, appears to have substantially the same radial dimensions under both pressure conditions.

Figure 5:
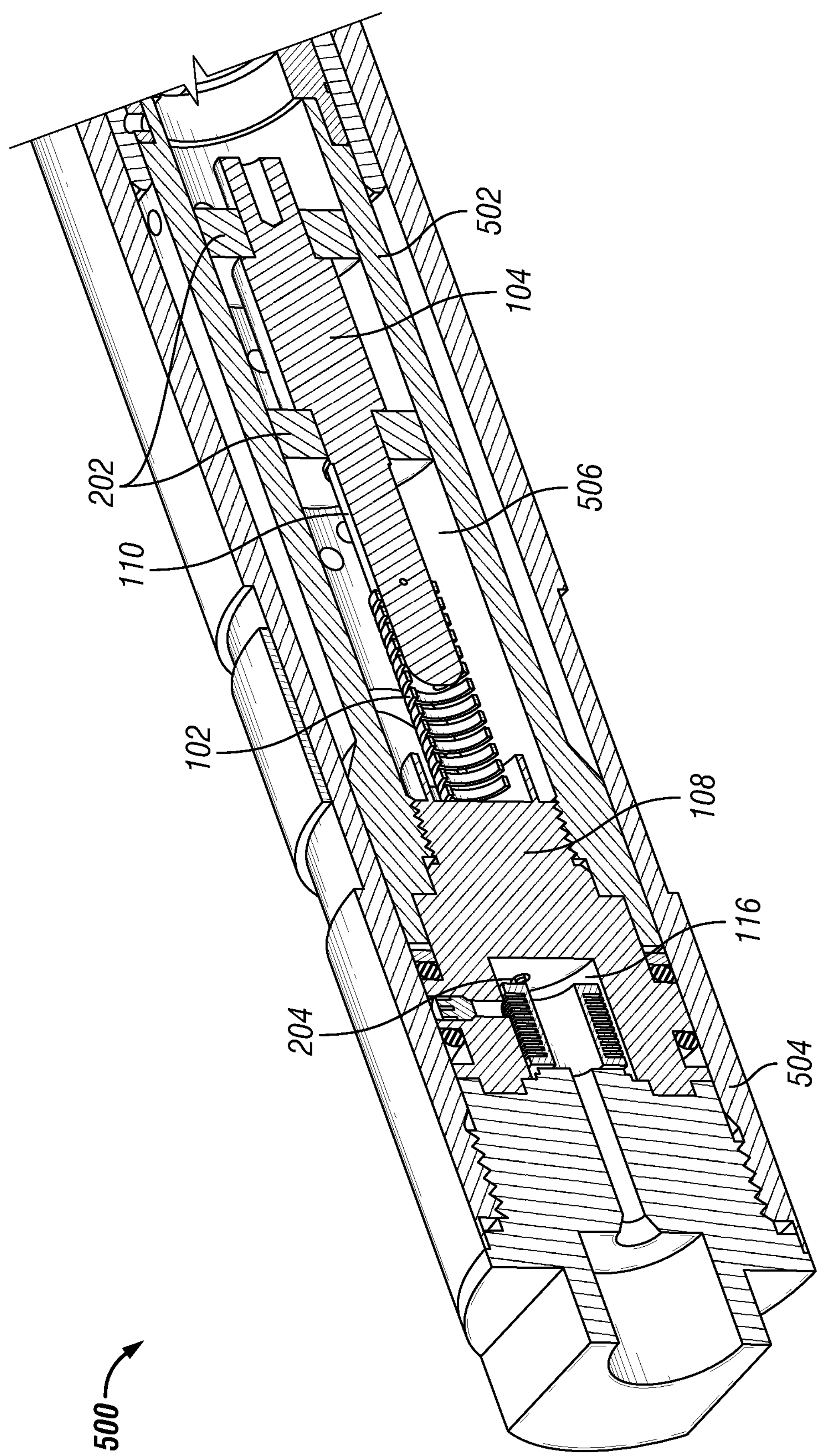
FIG. 5 illustrates a cross-sectional view of an apparatus including the pressure sensor of FIGS. 1A, 1B, and 2 according to an example embodiment.

FIG. 5 illustrates a cross-sectional view of an apparatus 500 including the pressure sensor 100 of FIGS. 1A, 1B, and 2 according to an example embodiment. To minimize redundancy, some features of the pressure sensor 100 are not repeated below.

The apparatus 500 includes an inner housing 502 that includes the anvil 104 and the Bourdon tube 102. The anvil 104 is electrically isolated from the inner housing 502 by the isolators 202. The inner housing 502, the pressure interface 108, and one of the isolators 202 proximal to the pressure interface 108 provide a compartment 506 which may protect the variable capacitor formed by the anvil 104, the dielectric material 110, and the helical segment 106 against contamination that may affect the capacitance of the variable capacitor. As described above, the isolators 202 also maintain the anvil 104 physically stable relative to the pressure interface 108.

In an example embodiment, outer housing 504 may hold components that may support the operation of the device. For example, the outer housing 504 may hold the resonator, such as a crystal or another resonator, described below with respect to FIG. 6.

Figure 6:
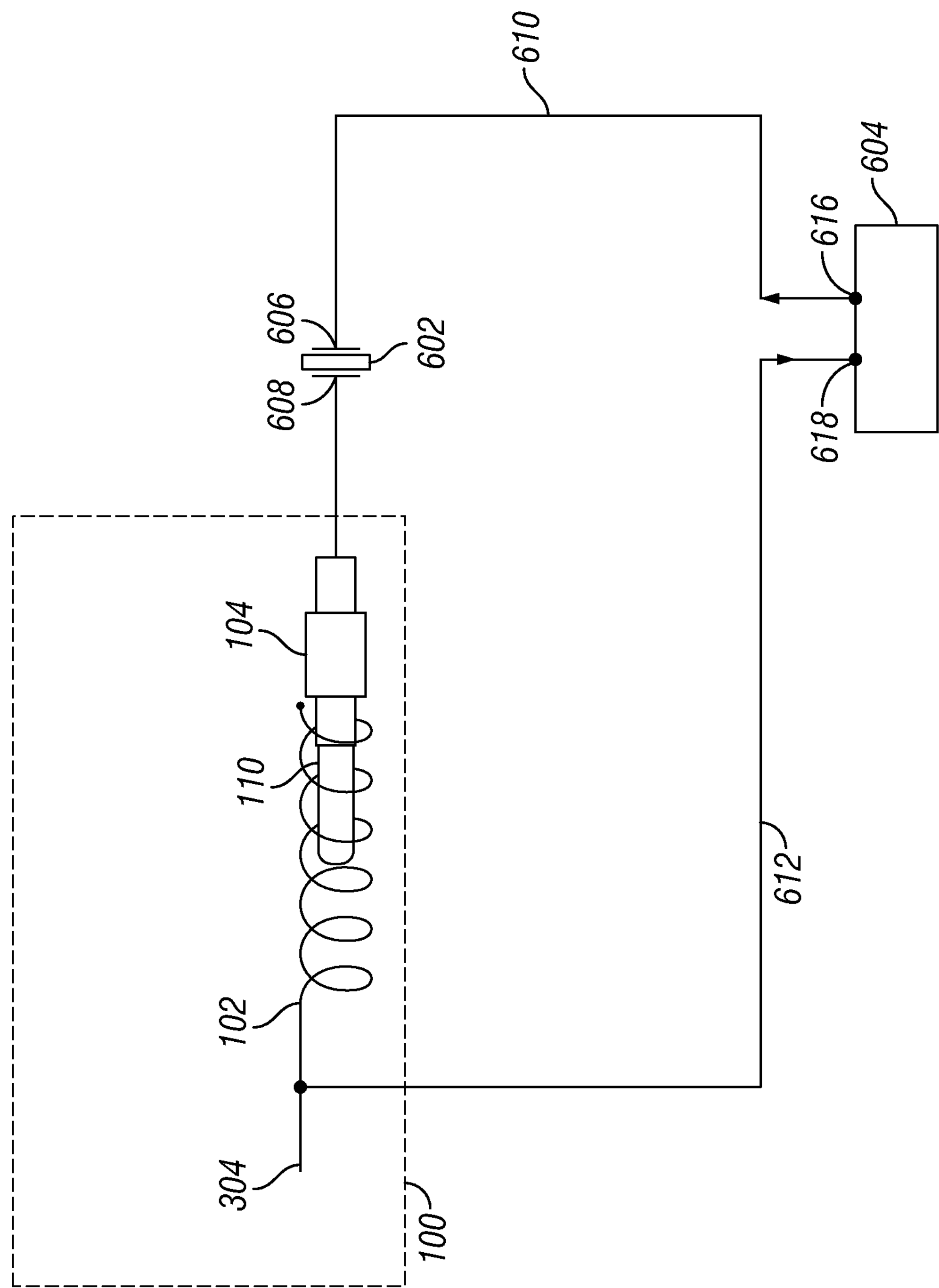
FIG. 6 illustrates a system for measuring a pressure of a fluid according to an example embodiment.

FIG. 6 illustrates a system 600 for measuring a pressure exerted by a fluid according to an example embodiment. The system 600 includes a crystal resonator 602, a network analyzer 604, and the pressure sensor 100 including the Bourdon tube 102 and the anvil 104. In an example embodiment, the network analyzer 604 includes a signal source that generates a signal and a receiver that receives a signal. An output port 616 of the network analyzer 604 is electrically coupled to a terminal 606 of the crystal resonator 602 and is configured to provide a signal to the crystal resonator 602 via an electrical connection 610 coupled to the terminal 606. For example, the signal provided to the crystal resonator 602 may have a frequency that varies in value within a range that may include a natural resonance frequency of the crystal resonator 602.

In an example embodiment, an input port 618 of the network analyzer 604 is coupled to the Bourdon tube 102 of the pressure sensor 100 by an electrical connection 612. For example, the input port 618 of the network analyzer 604 may be electrically coupled to the Bourdon tube 102 through a pressure interface, such as the pressure interface 108 of FIGS. 1A, 1B, and 2.

In an example embodiment, the input port 618 of the network analyzer 604 is electrically coupled to the Bourdon tube 102 by the electrical connection 612 that includes a wellhead of an oil or gas well. For example, the wellhead may be electrically coupled to the Bourdon tube 102 of the pressure sensor 100 placed inside an oil or gas well. Similarly, the electrical connection 610 between the network analyzer 604 and the terminal 606 of the crystal resonator 602 may include a well tubing.

In an example embodiment, a frequency of the signal corresponds to the pressure sensed by the pressure sensor 100. To illustrate, the crystal resonator 602 is in series with the variable capacitor formed by the anvil 104, the dielectric material 110, and the helical segment 106. In particular, a terminal 608 of the crystal resonator 602 is electrically coupled in series with the anvil 104 of the pressure sensor 100. As those skilled in the art would understand, the capacitance of the variable capacitor formed by the anvil 104, the dielectric material 110, and the helical segment 106 may pull the crystal resonator 502 away from its natural resonance frequency such that the crystal resonator 602 resonates at a frequency ("operating frequency") that is different from its natural resonance frequency. When the fluid pressure being sensed changes, the capacitance of the variable capacitor changes correspondingly, and in turn, the operating frequency of the crystal resonator 602 changes correspondingly. Thus, because the capacitance of the variable capacitor corresponds to the pressure sensed by the pressure sensor 100, and because the operating frequency of the crystal resonator 602 corresponds to the capacitance of the variable capacitor, the operating frequency of the crystal resonator 602 corresponds to and is indicative of the pressure sensed by the pressure sensor 100.

The operating frequency of the crystal resonator 602 may be determined by sweeping through various frequencies (i.e., varying the frequency) of the signal provided by the network analyzer 604 and processing the signal when it is received by the network analyzer 604 through the crystal resonator 602 and the pressure sensor 100. To illustrate, the crystal resonator 602 has low impedance when its operating frequency and the frequency of the signal from the network analyzer 604 match, and it has high impedance when the frequencies do not match. Thus, the signal, when received at the network analyzer 604 through the crystal resonator 602, may have one or more parameters (e.g., voltage level, power, etc.) that are indicative of whether the signal's frequency and the operating frequency of the crystal resonator 602 match. Accordingly, the operating frequency of the crystal resonator 602 may be determined by processing the signal, after it is received by the network analyzer 604, to determine one or more parameters, such as voltage level, power, and/or frequency of the signal. By determining the operating frequency of the crystal resonator 602, which is indicative of the pressure sensed by the pressure sensor 100, the pressure sensed by the pressure sensor 100 may be determined.

In an example embodiment, the network analyzer 604 can process the signal received through the crystal resonator 602 and the pressure sensor 100 to determine one or more parameters, such as the signal's voltage level, power, and/or frequency and to further determine the pressure sensed by the pressure sensor 100 based on the one or more parameters. Alternatively, the network analyzer 604 may determine the one or more parameters of the signal and pass the parameter (s) and/or other information to another device to determine the pressure of a fluid sensed by the pressure sensor 100.

Although FIG. 6 illustrates the crystal resonator 602 and the above description is based on the crystal resonator 602, in alternative embodiments, another resonator, such as an inductor-capacitor (LC) based resonator or an oscillator, may be used in the system 600 of FIG. 6 without departing from the scope of this disclosure. In alternative embodiments, instead of the network analyzer 604, a signal source and a receiver separate from the signal source, or one or more other devices may be used to send and/or receive a signal. Further, in some embodiments, the connection 612 may be at an electrical ground potential and may be coupled to an electrical ground. Further, in some embodiments, pressure sensing device may include the pressure sensor 100 and the crystal resonator 602, another resonator, or an oscillator.

Figure 7:
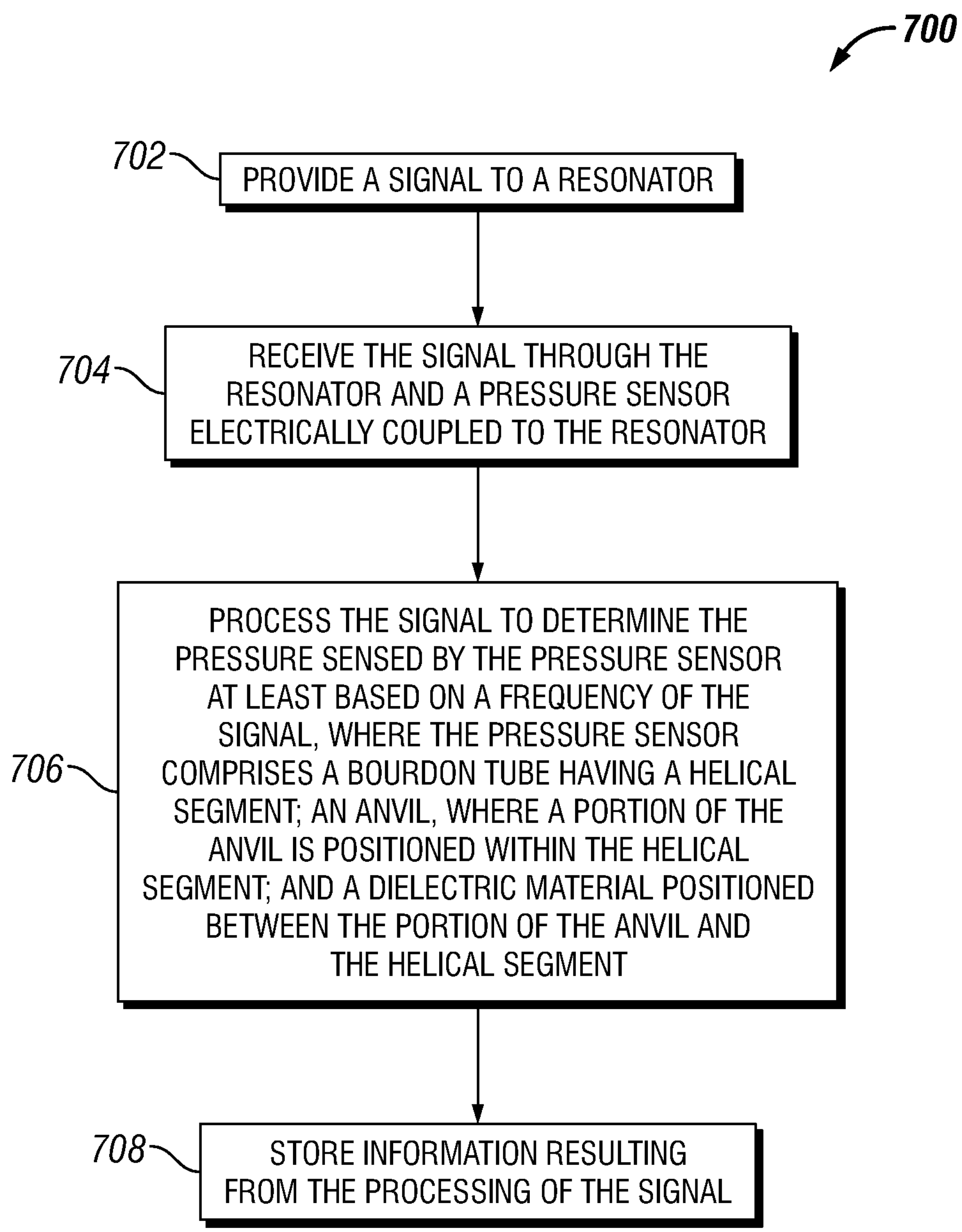
FIG. 7 illustrates a method for measuring a pressure of a fluid according to an example embodiment.

FIG. 7 illustrates a method 700 for measuring a pressure exerted by a fluid according to an example embodiment. The method 700 includes providing a signal to a resonator, at 702. For example, the network analyzer 604 of FIG. 6 provides a signal to the crystal 602. The method 700 also includes receiving the signal through the resonator and a pressure sensor electrically coupled to the resonator, at 704. For example, the network analyzer 604 may receive the signal through the crystal oscillator 602 and the pressure sensor 100.

The method 700 further includes processing the signal to determine the pressure sensed by the pressure sensor, at 706. For example, the network analyzer 604 of FIG. 6 may process the signal received through the crystal resonator 602 and the pressure sensor 100 to determine the pressure sensed by the pressure sensor 100. Processing the signal received through the crystal resonator and the pressure sensor may include determining one or more parameters of the signal, such as the voltage level, power, and/or frequency of the signal. The pressure sensed by the pressure sensor can be determined based on the frequency of the signal, which is indicative of the pressure sensed by the pressure sensor when the frequency of the signal matches the operating frequency of the signal, as described above with respect to FIG. 6. The pressure sensor includes a Bourdon tube having a helical segment, and an anvil, where a portion of the anvil is positioned within the helical segment. The pressure sensor also includes a dielectric material positioned between the portion of the anvil and the helical segment. For example, the pressure sensor 100 of FIGS. 1A, 1B, 2, and 6 includes the Bourdon tube 102 having the helical segment 106, the anvil 104, and the dielectric material 110. As illustrated in FIGS. 1A, 1B, and 2, the dielectric material 110 is positioned between the portion 100 of the anvil 104 and the helical segment 106.

Lastly, example method 700 concludes with step 708 wherein the information resulting from the processing is stored in memory. Those of skill in the art will appreciate that a conventional computing device comprising one or more processors and one or more memories may be included with or operate with the network analyzer 604. Network analyzer 604 may also include communications modules for wired or wireless communications with other local or remote computing devices.

Copies of photographs illustrating example embodiments of a pressure sensor, a Bourdon tube, and/or an anvil are included in Appendix A included herein.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A pressure sensor, comprising:

a Bourdon tube having a helical segment;

an anvil, wherein a portion of the anvil is positioned within the helical segment;

a dielectric material positioned between the portion of the anvil and the helical segment, wherein the anvil, the dielectric material, and the helical segment form a variable capacitor and wherein a capacitance of the variable capacitor changes based on a pressure applied to the Bourdon tube.

2. The pressure sensor of claim 1, wherein at least a portion of the helical segment is configured to have a dimensional change in response to a change in the pressure applied to the Bourdon tube and wherein the capacitance changes in response to the dimensional change.

3. The pressure sensor of claim 2, wherein the dimensional change of the helical segment includes a radial change of the portion of the helical tube.

4. The pressure sensor of claim 3, wherein the portion of the helical segment is configured to radially expand in response to an increase in the pressure applied to the Bourdon tube and wherein the portion of the helical segment is configured to radially shrink in response to a reduction in the pressure applied to the Bourdon tube.

5. The pressure sensor of claim 1, wherein the pressure is applied to the Bourdon tube through an open end of the Bourdon tube and wherein a closed end of the Bourdon tube is proximal to the helical segment.

6. The pressure sensor of claim 5, further comprising a pressure interface configured to interface with a fluid exerting the pressure, wherein the open end of the Bourdon tube is fixedly attached to the pressure interface.

7. The pressure sensor of claim 6, wherein the pressure interface includes a compartment configured to hold an isolation fluid separated from the fluid by a separator, wherein the open end of the Bourdon tube is exposed to the isolation fluid, and wherein the separator is configured to transfer the pressure from the fluid to the isolation fluid.

8. The pressure sensor of claim 1, further comprising an insulator attached to the anvil, the insulator configured to electrically isolate the anvil from an electrical ground.

9. The pressure sensor of claim 1, wherein the dielectric material is disposed on the portion of the anvil.

10. The pressure sensor of claim 1, wherein the pressure applied to the Bourdon tube ranges from 0 pounds per square inch (PSI) to 20,000 PSI.

11. The pressure sensor of claim 1, wherein the pressure sensor is configured to operate in an environment having a temperature exceeding 600 degrees Fahrenheit.

12. The pressure sensor of claim 1, wherein the anvil and the Bourdon tube are made of inconel.

13. A system for measuring a pressure of a fluid, the system comprising:

a resonator having a first terminal and a second terminal;

a signal source configured to provide a signal to the resonator via the first terminal of the resonator;

a receiver configured to receive the signal from the resonator; and a pressure sensor electrically coupled to the second terminal of the resonator and to the receiver, wherein the receiver is configured to receive the signal via the pressure sensor, the pressure sensor comprising:

a Bourdon tube having a helical segment;

an anvil, wherein a portion of the anvil is positioned within the helical segment;

a dielectric material positioned between the portion of the anvil and the helical segment.

14. The system of claim 13, wherein the anvil, the dielectric material, and the helical segment form a variable capacitor, wherein a capacitance of the variable capacitor changes based on a pressure applied to the Bourdon tube.

15. The system of claim 14, wherein the anvil and the second terminal of the resonator are coupled by a first electrical connector and wherein the Bourdon tube and the receiver are coupled by a second electrical connector.

16. The system of claim 13, wherein the resonator is a crystal resonator and wherein the signal source is configured to vary a frequency of the signal.

17. A method for measuring a pressure of a fluid, the method comprising:

providing a signal to a resonator;

receiving the signal through the resonator and a pressure sensor electrically coupled to the resonator;

processing the signal to determine the pressure sensed by the pressure sensor based on a frequency of the signal, wherein the pressure sensor comprises:

a Bourdon tube having a helical segment;

an anvil, wherein a portion of the anvil is positioned within the helical segment;

and a dielectric material positioned between the portion of the anvil and the helical segment.

18. The method of claim 17, wherein the anvil, the dielectric material, and the helical segment form a variable capacitor, wherein a capacitance of the variable capacitor changes based on a pressure applied to the Bourdon tube.

19. The method of claim 17, further comprising varying a frequency of the signal provided to the resonator.

20. The method of claim 19, wherein the resonator is a crystal resonator and wherein processing the signal includes determining a voltage level of the signal after receiving the signal through the resonator and the pressure sensor.

* * * * *